March 6, 1956     F. E. LA BONTE     2,737,204
CONDUIT STRUCTURE

Filed Sept. 16, 1952     2 Sheets-Sheet 1

INVENTOR.
FRED E. LA BONTE
BY
ATTORNEYS

March 6, 1956     F. E. LA BONTE     2,737,204
CONDUIT STRUCTURE

Filed Sept. 16, 1952     2 Sheets-Sheet 2

INVENTOR.
FRED E. LA BONTE
BY
ATTORNEYS

United States Patent Office 2,737,204
Patented Mar. 6, 1956

2,737,204

CONDUIT STRUCTURE

Fred E. La Bonte, Oxnard, Calif.

Application September 16, 1952, Serial No. 309,958

2 Claims. (Cl. 138—77)

(Granted under Title 35, U. S. Code (1952), sec. 266)

The invention described herein may be manufactured and used by or for the Government of the United States of America for governmental purposes without the payment of any royalties thereon or therefor.

This invention relates to structures for carrying and protecting electrical power and transmission lines, and is particularly concerned with conduit or underground duct systems for this purpose.

Prior art conduit structures of this type involve the use of bituminous impregnated fiber, cement-asbestos, vitrified clay, soapstone and the like, as materials employed in the construction of the ducts in such structures. Consequently the prior art structures currently in use suffer particularly from the disadvantage that the ducts employed therein are heavy and rigid in shape. Moreover, these ducts or conduits are manufactured in short lengths and when installed must be fastened together with various types of connectors and held in place with heavy and costly spacers. The use of short lengths of conduit held together by a series of connectors always presents the danger of leakage through the joints between individual conduits with consequent damage to the cables or lines carried therein.

One object of the invention is to provide structures for carrying and protecting electrical power and transmission lines.

Another object is the provision of conduit and duct systems particularly adapted for underground use, and constructed of inexpensive and readily available materials which are essentially chemically inert, such systems being resistant to leakage of fluids into the ducts thereof from the outside and being durable and readily maintained at low cost.

Another object is to afford procedure for making the foregoing structures and conduit systems.

Figure 3:
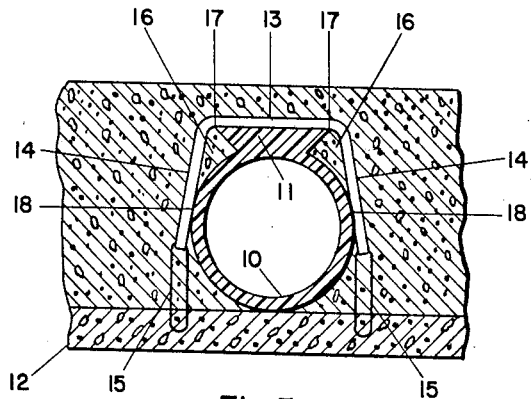
Figure 2:
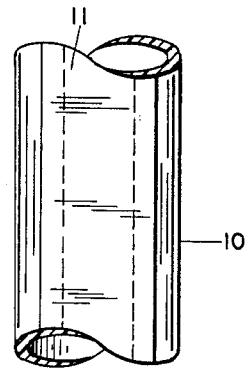
Figure 1:
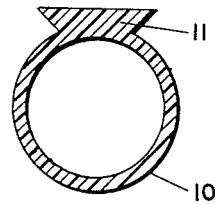
Figure 4:
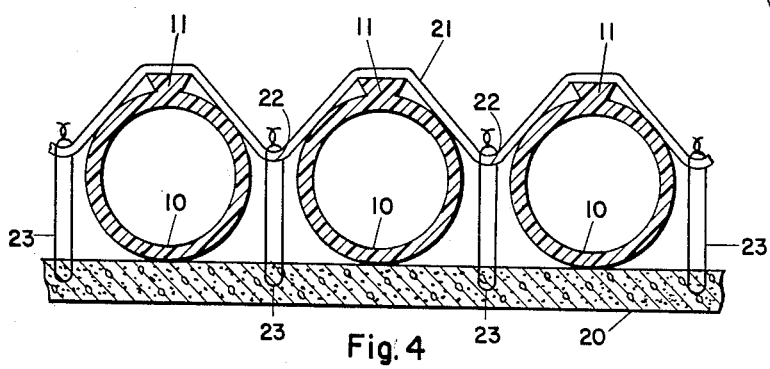
Figure 5:
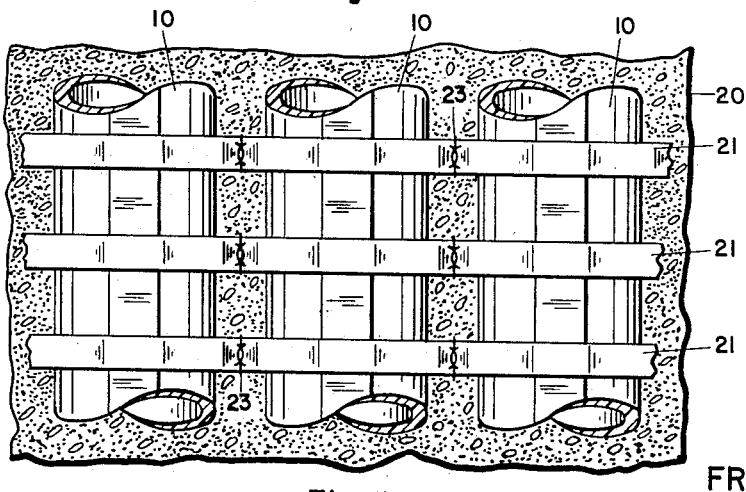
Figure 8:
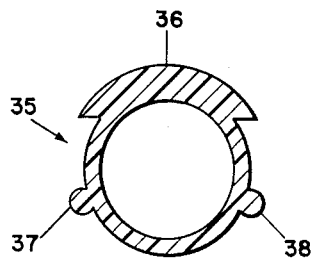
Figure 7:
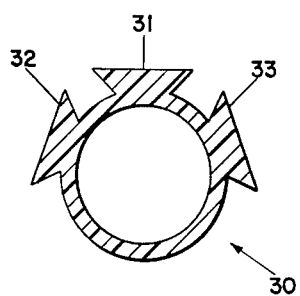
Figure 6:
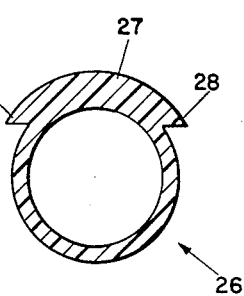
Figure 9:
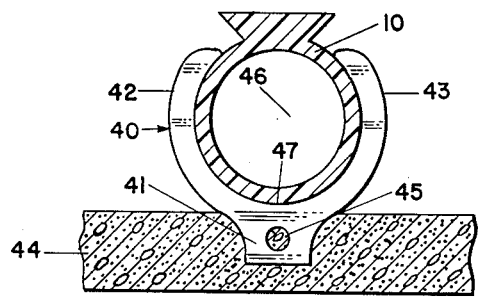
Figure 10:
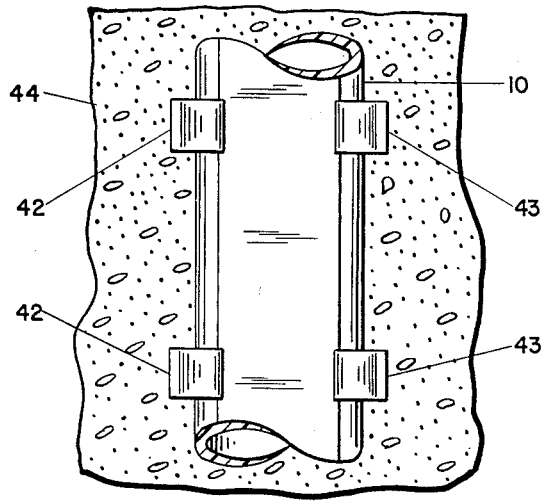

Other objects and many of the attendant advantages of this invention will be readily appreciated as the same becomes better understood by reference to the following detailed description when considered in connection with the accompanying drawings wherein:

Fig. 1 is a cross-sectional view of one type of tube or duct employed in the instant invention, Fig. 2 is a plan view of the tube of Fig. 1, Fig. 3 shows a cross section of one embodiment of the conduit structure of the invention, Fig. 4 represents another embodiment of the conduit structure of the invention, Fig. 5 is a plan view of the embodiment of Fig. 4, Fig. 6 is a modification of the tube shown in Fig. 1, Fig. 7 is still another modification of such tube, Fig. 8 represents a still further modification of the tube employed in the invention, Fig. 9 shows another modification of the conduit structure of the invention and Fig. 10 is a plan view of the modification shown in Fig. 9.

In accordance with the invention, a structure is provided which comprises a body of concrete having embedded therein a continuous flexible tube or duct, including retaining means thereon integral with its outer wall, such retaining means maintaining said tube securely in contact with the concrete and preventing internal collapse of the tube. According to a preferred embodiment of the invention, a conduit structure of this type for carrying and protecting electrical power and transmission lines is afforded, such structure comprising a plurality of continuous flexible thermoplastic tubes of the above type. The tubes are positioned substantially parallel to each other on a base. Each of the tubes has as the retaining means a rib or a lug integral with the outer wall of the tube and preferably extending longitudinally along the top of the tube and coextensive therewith. Spacer members are provided for maintaining the tubes in position parallel to each other. A body of concrete surrounds the tubes and spacer members, the above noted ribs or lugs on the tubes serving to maintain the outer surface thereof locked securely in contact with the surrounding concrete and preventing internal collapse of the tubes.

As an additional feature of the invention, the foregoing structures are readily fabricated by a process which involves positioning on a base the continuous flexible tube, inflating the tube with a gas under pressure, securing the inflated tube to the base to prevent movement of the tube during the subsequent concrete pouring step, covering the tube with a body of concrete, hardening the concrete and reducing the gas pressure within the tube. The retaining means or lugs on the tube thereafter maintain it securely in contact with the concrete and prevent collapse of the tube.

The conduits or ducts employed in the invention are in the form of tubes of a continuous flexible type which may be rolled substantially flat, similar to fire hose, and cut to any desired length. These tubes are preferably constructed of thermoplastic materials such as cellulose esters, e. g. cellulose acetate, vinyl and arylic resins. The tubes may have any suitable cross sectional shape, regular or irregular, such as a circular or elliptical form. The diameter of the tubes employed herein may be up to 6" or more, with a thickness up to ¼" or greater. Tube lengths of 300 ft. or more may be utilized in accordance with the invention.

Figs. 1 and 2 of the drawing represent a flexible thermoplastic tube 10, which may be employed as a duct or conduit in the invention. The tube has a lock member 11 thereon integral with its outer wall, which lock member is shown as a rib having a cross section in the form of a downwardly tapering wedge and extending longitudinally along the tube coextensive therewith. Such tube with the lock member or rib 11 thereon is readily made by molding or extrusion processes.

Fig. 3 illustrates the invention structure incorporating the tube of Figs. 1 and 2. This structure is made according to the invention principles by first placing the tube 10 on a base 12, usually of concrete, with the rib 11 located at the top of the tube. The tube is then inflated with a gas such as air. A convenient way for inflating the tube is to seal one of its ends by means of heat or by clamping it and to introduce compressed air at the other end. The tube may be inflated to any suitable pressure sufficient to render it rigid and to support the weight of concrete to be poured thereover. For example, a pressure of about 10 pounds per square inch may be suitable in some instances.

The tube is then secured in position by placing an elongated strip of material 13, which may be flexible or preferably rigid, over the top of rib 11, each of the ends 14 of such member being bent downwardly beyond the opposite top edges 17 of rib 11, and extending into contact with opposite sides 18 of tube 10. If member 13 is made of a rigid material, it may be constructed of thermosetting resins such as Bakelite (phenolformaldehyde resin). Member 13 may be of any suitable width, e. g. ½" to 1½", and thickness, e. g. ⅛" to ⅜", and a plurality of these members may be placed at various intervals, e. g. 3 ft. apart, parallel to each other along the length of the tube. The ends 14 of member 13 are each connected to tie-down wires 15, the other ends of such wires being embedded in or secured to the base 12. A body of concrete is then poured over this assembly, the tube thereof being maintained securely in relation to the base and prevented from floating while the concrete envelope is being placed. After the concrete has dried, the air pressure within the tube is released, leaving the tube supported in relation to the concrete body essentially through contact of concrete shoulders 16 with the downwardly sloping sides of rib 11. The tube 10 is thus maintained in position without collapsing while retaining its circular shape. Cables (power or communication lines) are then placed inside the tube.

Figs. 4 and 5 represent a preferred structure in accordance with the invention, which structure is essentially based on that of Fig. 3. In fabricating the structure of Figs. 4 and 5, a number of tubes 10 having ribs 11 thereon, are positioned parallel to each other on a concrete base 20, each of the ribs being located at the top of the tube as in Fig. 3. The tubes are inflated with air, and a number of spacer members 21 are positioned parallel to each other transversely across the tubes, the spacers being placed at essentially regular intervals along the length of the tubes. If desired, however, these spacers may be positioned at irregular intervals lengthwise of the tube. Each spacer member is in the form of an elongated rigid strip of thermosetting plastic, similar to strip 13 of Fig. 3, but bent at regular intervals so as to alternately fit over the top of rib 11 of one tube and then slope downwardly and then upwardly to rib 11 of the adjacent tube, the sloping portions of the spacer member contacting opposite sides of each of the tubes. Between adjacent tubes, the lowermost portions 22 of the spacer members 21 have fastened thereto tie-down wires 23, the opposite ends of which are embedded in base 20. The concrete is then poured over the tubes and spacers, following which the concrete is allowed to harden and the pressure finally released from within the tubes.

If desired, after one horizontal tier of tubes has been encased in concrete as described above with respect to Figs. 4 and 5, a second tier may be placed above this and so on.

In place of using the lock member having the wedge shaped configuration of rib 11 in the embodiment of Fig. 1, lock members having other shapes may be employed, provided they will function to support the tube in normal position in the surrounding concrete body without sag or collapse of the tube. Further, the lock member may be coextensive with the length of the tube, as shown in Fig. 2, or such member may be in the form of discontinuous individual lugs spaced at intervals along the length of the tube. Use of a continuous rib as the lock member or retaining means, as illustrated in Fig. 2, is preferred since it serves to provide greater support for the tube along its length, and further, a tube having such a continuous member is easier to fabricate by extrusion methods.

Fig. 6 shows a tube 26 having a lock member 27 integral with the walls thereof and extending continuously from end to end of the tube. Such lock member has a cross section in the form of an arc of a circle, with sufficient thickness to provide at opposite ends of the arc section shoulders 28 having enough width to support the tube when such shoulders are in contact with the concrete adjacent thereto, according to the invention principles.

While the use of a single lock member, located at the top of the tube as shown in the modifications of Figs. 1 and 6, is generally sufficient to support the tube in its concrete casing or envelope when the tube is of smaller size, e. g. 2½" diameter, for larger size tubes, e. g. those having diameters of say 4" or more, it may be desirable to add support to the sides of the tube to avoid any tendency toward buckling or collapse thereof. Such buckling may tend to occur after the tube has been in place some time as result of seepage of water out of the concrete and formation of water pockets adjacent the outer side walls of the tube, exerting pressure on the tube.

Hence, especially when tubes of 4" or greater diameter, e. g. 6", are employed, the tube modifications of Figs. 7 and 8 may be utilized. In Fig. 7 is shown a tube 30 having three wedge shaped ribs 31, 32 and 33, similar to rib 11 of Fig. 1, the two outside ribs 32 and 33 affording additional support of the sides of the tube. Fig. 8 shows another modification in the form of a tube 35 having integral with its outer wall an arc shaped rib 36 along the length of the tube, similar to rib 27 of the tube of Fig. 6, tube 35 also having integral with its opposite side walls two ribs 37 and 38 of small circular cross section and coextensive with the length of the tube. As in the case of the two side ribs 32 and 33 in the embodiment of Fig. 7, the circular ribs 37 and 38 serve to lock the adjacent side walls of tube 35 to the surrounding concrete envelope and prevent subsequent collapse of these walls resulting from external pressure exerted thereon.

Means other than those shown in Figs. 3 and 4 may be employed for securing the flexible tubes of the invention in position on a base prior to pouring the concrete. Thus, in place of the strip 13 and tie-down wires 15 of the structure of Fig. 3, or of the spacer members 21 and tie-down wires 23 of the structure of Figs. 4 and 5, tube 10 may be held in place in the manner shown in Figs. 9 and 10. According to this embodiment, plastic horse shoe shaped members 40 each having a lug 41 extending outwardly midway between arms 42 and 43 of the member, are positioned parallel to each other at intervals along a concrete base 44 by embedding lugs 41 of such members in the concrete base. Lugs 41 each have a hole 45 therein into which concrete flows to securely hold members 40 in place, which members may have a thickness say of about 1 inch.

A tube 10 is then placed in space 46 of members 40 formed within the arms 42 and 43 thereof, and supported along the bottom 47 of the inner portion of such members. The tube is then inflated so that its sides are almost completely in contact with and are supported along the inner surface of horse shoe members 40. Concrete is then pourned over this structure and after the concrete has hardened, the pressure within the tube is reduced leaving the tube locked in the concrete according to the invention.

From the foregoing it is apparent the instant invention provides a conduit structure for carrying and protecting electrical power and transmission cables, which structure has many advantages over the prior art. These advantages include (1) low initial cost, (2) use of readily available materials, (3) ease and economy of assembly, (4) low maintenance cost, (5) provision of a continuous water-tight construction, (6) maximum cable protection, (7) elimination of transportation bulk and weight, (8) employment of chemically inert and non-conductive plastics for construction of the ducts, (9) reduction of cable corrosion and electrolysis, (10) durability, which permits repeated cable changes with a minimum of wear or damage and (11) overall efficiency.

Obviously many modifications and variations of the present invention are possible in the light of the above teachings. It is therefore to be understood that within the scope of the appended claims the invention may be practiced otherwise than as specifically described.

I claim:
1. A conduit structure for carrying and protecting electrical power and transmission lines, comprising a plurality of continuous flexible thermoplastic tubes positioned substantially parallel to each other on a base, each of said tubes including a rib integral with the outer wall of said tube and extending longitudinally along the top thereof coextensive therewith, the cross section of said rib being in the form of a downwardly tapering wedge, spacer members for maintaining said tubes in position parallel to each other, said spacer members being elongated plastic members positioned parallel to each other, each of said members extending transversely across said tubes in contact with the ribs thereof and being bent downwardly between adjacent tubes, said spacer members and tubes being maintained in position by means of tie-down wires connected to said base and said spacer members at points intermediate said tubes, said tubes being of substantially circular cross section, and a substantially unitary homogeneous body of concrete surrounding said tubes and spacer members, said ribs maintaining the outer surface of each of said tubes immovable and locked securely in contact with said concrete and preventing internal collapse of said tubes.

2. A structure which comprises a substantially unitary body of concrete having immovably embedded therein a plurality of continuous flexible tubes including retaining means integral with the outer walls thereof, said retaining means maintaining said tubes securely in contact with said concrete and preventing internal collapse of said tubes, spacer members for maintaining said tubes in position, said spacer members being elongated plastic members positioned parallel to each other, each of said members extending transversely across said tubes in contact with the ribs thereof and being bent downwardly between adjacent tubes, said spacer members and tubes being maintained in position by means of tie-down wires connected to said base and said spacer members at points intermediate said tubes, and wherein said tubes are of substantially circular cross section.

References Cited in the file of this patent

UNITED STATES PATENTS

| | | |
|---|---|---|
| 697,845 | Hultman | Apr. 15, 1902 |
| 1,744,102 | Burke | Jan. 21, 1930 |
| 2,230,688 | Irwin | Feb. 4, 1941 |
| 2,243,273 | Edwards | May 27, 1941 |
| 2,299,111 | Rogers et al. | Oct. 20, 1942 |
| 2,400,493 | Fischer | May 21, 1946 |
| 2,456,400 | Giannopulos | Dec. 14, 1948 |

FOREIGN PATENTS

| | | |
|---|---|---|
| 8,533 | Great Britain | Apr. 4, 1914 |